April 12, 1932.  J. H. BUHRIE  1,854,103
REEL CONSTRUCTION
Filed May 24, 1930
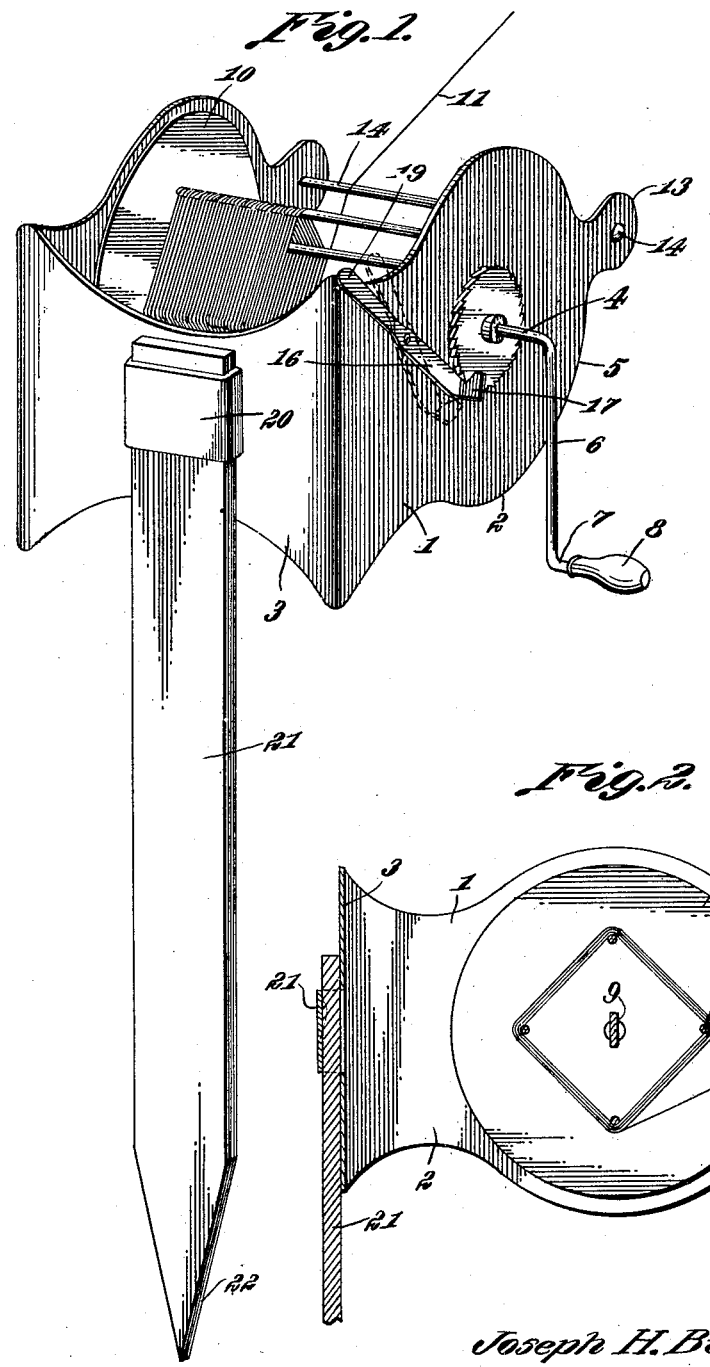
Joseph H. Buhrie,
INVENTOR
BY Victor J. Evans
ATTORNEY
WITNESS: William Thompson Patented Apr. 12, 1932

1,854,103

UNITED STATES PATENT OFFICE

JOSEPH H. BUHRIE, OF YUKON, PENNSYLVANIA

REEL CONSTRUCTION

Application filed May 24, 1930. Serial No. 455,374.

This invention relates to a reel for use by children or others who are engaged in flying a kite. It frequently happens that the child or other person flying a kite will desire to rest for a greater or less period of time and is prevented from doing so due to the absence of some stationary part in the vicinity of the place where he is flying the kite and therefore the present invention has as a further object to provide a reel and a supporting means for the reel embodying a standard which may be driven into the ground so as to support the reel.

Another object of the invention is to provide a reel so constructed that it will take up a maximum length of cord or line through a minimum number of rotations of its spool so that the kite may be drawn in by a minimum number of rotations of a crank handle which is connected with one end of the shaft upon which the wheel spool is mounted.

Another object of the invention is to provide a novel means for guiding the line so that it cannot become entangled with any part of the device due to a swishing of the kite in the winding.

Another object of the invention is to provide means whereby the reel may be held against rotation after the desired length of line has been paid out therefrom.

This invention also consists in certain other features of construction and in the combination and arrangement of the several parts to be hereinafter fully described, illustrated in the accompanying drawings, and specifically pointed out in the appended claim, it being understood of course that minor changes may be made so long as they fall within the scope of the claim.

In describing my invention in detail, reference will be had to the accompanying drawings, wherein like characters denote like or corresponding parts throughout the several views, and in which:

Figure 1 is a perspective view of the reel embodying the invention.

Figure 2 is a vertical front to rear sectional view through the reel.

The reel comprises a housing which is indicated in general by the numeral 1 and which is formed of sheet metal and this housing comprises spaced side members 2 and a connecting rear member 3, a single integral blank being preferably employed in forming this housing. A shaft 4 which may be of a stout wire, is formed centrally in portions 5 of the side members 2, which portions are of substantially circular marginal contour, and one end of the wire is bent at right angles as indicated by the numeral 6, thence outwardly at right angles as indicated by the numeral 7 and provided with a hand grip 8 so that in this manner a crank handle is provided for imparting rotary motion to the said member 4. As shown in Figure 2 the shaft throughout that portion of its length which extends between the side members 5 is preferably flattened as indicated by the numeral 9 so that the ends of this flat portion by engagement against the inner sides of the portions 5 of the side members 2, will be held against any longitudinal play or slippage.

Circular sheet metal heads 10 are fixed upon the ends of the shaft 4, preferably at the ends of the flat portions 9 and may be soldered or welded, as desired. The line which is to be wound upon the reel is indicated by the numeral 11 and this line is wound about a series of rods 12 which are fixed at their ends in openings in the heads 10, these rods being equidistantly spaced with respect to each other and arranged concentrically about the shaft 4 and equidistantly spaced from said shaft.

In order that the line 11 may be guided, ears 13 are formed upon the forward edges of the portions 5 of the side members 2 and a rod 14 is mounted at its ends in openings formed in these ears, and the line 11 is passed over this rod as clearly shown in Figures 1 and 2 of the drawings.

In order that the shaft 4 may be held against rotation in a direction to pay out the line or cable 11, a ratchet gear 15 is fixed upon the shaft 4 at that end at which the crank handle 6 is located, and a pawl 16 which is preferably formed of sheet metal and which has a right angular bent end portion 17 is pivotally mounted between its ends as at 18 upon the side member 2 beside which the ratchet gear 5 is positioned, the other end of the pawl 16 projecting upwardly and being rounded so as to provide a handle portion 19 by which the pawl may be drawn into and out of engagement with the teeth of the ratchet gear 15.

As before stated, the invention contemplates the provision of means for anchoring the reel at the ground level and this means comprises a rectangular socket 20 which is stamped out from the connecting portion 3 of the housing 1 and a standard 21 which may be of wood or of bar metal, and which is fitted at its upper end, removably, in the socket 20, the lower end of this standard being tapered at a point as indicated by the numeral 22 so as to adapt the same to be readily embedded in the ground and thereby support the housing 1 and the reel mounted therein when so desired.

What I claim is:—

A reel of the class described comprising a housing including side members and a member extending between and connecting the said side members, a shaft rotatably mounted in the side members and having a crank handle at one end, circular heads mounted upon the shaft beside the side members, rods extending between and connecting the said heads adjacent the peripheries thereof, a line guiding rod extending between the side members, a socket member upon the connecting member of the housing, and a separable standard adapted to have one end thereof fitted in the socket member and having its opposite end pointed and adapted to be embedded in the ground.

In testimony whereof I affix my signature.

JOSEPH H. BUHRIE.